United States Patent
Kiyotani

(10) Patent No.: US 8,688,397 B2
(45) Date of Patent: Apr. 1, 2014

(54) ERROR CALCULATION METHOD FOR ANGLE DETECTION DEVICE

(75) Inventor: Shingo Kiyotani, Tsukuba (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 434 days.

(21) Appl. No.: 12/831,665

(22) Filed: Jul. 7, 2010

(65) Prior Publication Data

US 2011/0010127 A1 Jan. 13, 2011

(30) Foreign Application Priority Data

Jul. 10, 2009 (JP) ................. 2009-163326

(51) Int. Cl.
*G01C 17/38* (2006.01)

(52) U.S. Cl.
USPC .............................. 702/94; 702/95

(58) Field of Classification Search
USPC .................................................. 702/94, 95
See application file for complete search history.

(56) References Cited

U.S. PATENT DOCUMENTS

2006/0043964 A1* 3/2006 Watanabe et al. ............. 324/200

FOREIGN PATENT DOCUMENTS

| JP | 07-140844 | | 6/1995 |
|---|---|---|---|
| JP | 2003262518 A | * | 9/2003 |
| JP | 2006-098392 | | 4/2006 |
| JP | 2007-178320 | | 7/2007 |

OTHER PUBLICATIONS

Translation of JP-2007-178320, Kikawa Hayami, Rotary Encoder, Published Jul. 12, 2007, all pages.*
Japanese Office Action mailed Feb. 5, 2013 and English Translation, 4 pages.

* cited by examiner

*Primary Examiner* — John Breene
*Assistant Examiner* — Manuel Rivera Vargas
(74) *Attorney, Agent, or Firm* — Rankin, Hill & Clark LLP

(57) ABSTRACT

An angle detection device formed in the shape of a disk includes: a graduation plate having a plurality of graduation lines being provided radially from the center toward the circumference thereof; and two detectors being disposed along the circumference of the graduation plate in a manner to be opposite to each other in a radial direction, the detectors detecting the graduation lines. The angle detection device is configured to calculate a center error based on angles detected by the detectors.

5 Claims, 13 Drawing Sheets

ERROR CALCULATION METHOD FOR ANGLE DETECTION DEVICE

The entire disclosure of Japanese Patent Application No. 2009-163326, filed Jul. 10, 2009, is expressly incorporated by reference herein.

BACKGROUND OF THE INVENTION

1. Field of the Invention

The present invention relates to an error calculation method for an angle detection device.

2. Description of Related Art

A typically-known angle detection device is formed in the shape of a disk and includes: a graduation plate with a plurality of graduation lines provided radially from the center toward the circumference thereof; and a detector that detects the graduation lines. The angle detection device is configured to detect the rotation angle of the graduation plate based on an angle detected by the detector (see, for instance, Document 1, JP-A-07-140844).

An encoder device (angle detection device) disclosed in Document 1 includes: a circular plate (graduation plate) with a detectable portion (graduation lines); and two sensor members (detectors), in which the sensors are disposed at symmetrical positions relative to the rotation center of the circular plate. The encoder device calculates the average of angles detected by the sensor members to calculate the rotation angle of the circular plate.

FIG. 8A schematically shows a graduation plate 101 and FIG. 8B schematically shows detectors 102. FIG. 9 schematically shows an angle detection device 10.

As shown in FIGS. 8A, 8B and 9, the angle detection device 10 includes: a graduation plate 101 with a plurality of graduation lines 101A; and two detectors 102 disposed along the circumference of the graduation plate 101, the detectors 102 detecting the graduation lines 101A, in which the rotation angle of the graduation plate 101 is detected based on angles detected by the detectors 102.

In the angle detection device 10, as shown in FIG. 9, an error (hereinafter referred to as a center error) can be generated between a center O of the detectors 102 and a center O' of the graduation plate 101 as a result of assembling, attachment to an object, a change in the temperature, or the like, which eventually leads to an error in the detected rotation angle of the graduation plate 101 (hereinafter referred to as an angle error).

Since the encoder device disclosed in Document 1 calculates the average of angles detected by the sensor members to detect the rotation angle of the circular plate, the angle error can be reduced.

However, as shown by the broken line in FIG. 9, the center O' of the graduation plate 101 may rotate along with the rotation of the graduation plate 101.

The encoder device disclosed in Document 1 cannot reduce the angle error.

FIGS. 10A and 10B show the results of simulation of the relationship between the detected angle of the angle detection device 10 and the rotation angle of the graduation plate 101. FIG. 10A is a graph where the detected angle is represented by the vertical axis and the rotation angle of the graduation plate 101 is represented by the horizontal axis. FIG. 10B is a graph where the angle error is represented by the vertical axis and the rotation angle of the graduation plate 101 is represented by the horizontal axis.

The simulation was performed under the condition that the middle point in a straight line connecting the detectors 102 is defined as the center O of the detectors 102, the center O' of the graduation plate 101 moves on the circumference of a circle with a radius equal to a center error $\delta$ along with the rotation of the graduation plate 101, and the angle detection device 10 has no error except the center error $\delta$.

Without the center error $\delta$, the angle detected by the angle detection device 10 is coincident with the rotation angle of the graduation plate 101 as shown by the broken line in FIG. 10A. However, if the center error $\delta$ occurs, an angle error is generated between the detected angle and the rotation angle of the graduation plate 101 as shown in the solid line in FIG. 10A. Specifically, as shown in FIG. 10B, the angle error is generated at the same frequency as the rotation of the graduation plate 101.

FIG. 11 shows the relationship between a rotation angle $\theta$ of the graduation plate 101 and detected angles $\theta_{A1}$, $\theta_{A2}$ of the detectors 102. Incidentally, in FIG. 11, a cartesian coordinate system with its origin at the center O of the detectors 102 is defined, in which an axis connecting the detectors 102 is defined as the X-axis and an axis orthogonal to the X-axis is defined as the Y-axis. The center O' of the graduation plate 101 assumably exists on the X-axis before the rotation of the graduation plate 101 so that a cartesian coordinate system with its origin at the center O' of the graduation plate 101 is defined. An axis set in the X-axis direction before the rotation of the graduation plate 101 is defined as an $X_E$-axis and an axis orthogonal to the $X_E$-axis is set as a $Y_E$-axis.

In FIG. 11, the detector 12 on the right side is denoted as 102A1 and the detector 12 on the left side is denoted as 102A2.

As shown in FIG. 11, when the graduation plate 101 rotates by the rotation angle $\theta$, the detected angle $\theta_{A1}$ of the detector 102A1 is equal to an angle between the $X_E$-axis and a straight line connecting the center O' of the graduation plate 101 and the detector 102A1. The detected angle $\theta_{A2}$ of the detector 102A2 is equal to an angle between a straight line connecting the center O of the detectors 102 and the center O' of the graduation plate 101 and a straight line connecting the center O' of the graduation plate 101 and the detector 102A2.

The detected angles $\theta_{A1}$, $\theta_{A2}$ of the detectors 102A1, 102A2, which respectively contain angle errors $\Delta\theta_{A1}$, $\Delta\theta_{A2}$ resulting from the center error $\delta$, are represented by the following equations (1):

$$\theta_{A1} = \theta + \Delta\theta_{A1}$$

$$\theta_{A2} = \theta + \Delta\theta_{A2} \quad (1)$$

In the encoder device disclosed in Document 1, the rotation angle $\theta$ of the graduation plate 101, which is calculated by calculating the average of the detected angles $\theta_{A1}$, $\theta_{A2}$ of the detectors 102A1, 102A2, is represented by the following equation (2):

$$\frac{\theta_{A1} + \theta_{A2}}{2} = \frac{2\theta + \Delta\theta_{A1} + \Delta\theta_{A2}}{2} \quad (2)$$

$$= \theta + \frac{\Delta\theta_{A1} + \Delta\theta_{A2}}{2}$$

In other words, in order to calculate the rotation angle $\theta$ of the graduation plate 101 without any error, it is required that the following equation (3) is established:

$$\Delta\theta_{A1} + \Delta\theta_{A2} = 0 \quad (3)$$

FIGS. 12A, 12B show the results of simulation of the angle errors $\Delta\theta_{A1}$, $\Delta\theta_{A2}$ when the center error $\delta$ is relatively large. FIGS. 13A, 13B show the results of simulation of the angle errors $\Delta\theta_{A1}$, $\Delta\theta_{A2}$ when the center error δ is relatively small. Incidentally, FIGS. 12A, 12B and FIGS. 13A, 13B are graphs in which the angle error is represented by the vertical axis and the rotation angle of the graduation plate 101 is represented by the horizontal axis. When the distance between the center O of the detectors 102 and the detectors 102 is set at 1, the center error δ is equal to 0.3 in the simulation of FIGS. 12A, 12B and the center error δ is equal to 0.003 in the simulation of FIGS. 13A, 13B.

The total of the angle errors $\Delta\theta_{A1}$, $\Delta\theta_{A2}$ does not become 0 irrespective of the amount of the center error δ as shown in FIGS. 12A, 12B and FIGS. 13A, 13B, and therefore the above equation (3) is not established.

Thus, when the center O' of the graduation plate 101 rotates along with the rotation of the graduation plate 101, the angle error cannot be reduced without calculating the center error δ.

SUMMARY OF THE INVENTION

An object of the invention is to provide an angle detection device and an error calculation method, capable of calculation of a center error between the center of detectors and the center of a graduation plate.

According to an aspect of the invention, an error calculation method for an angle detection device, the angle detection device including: a graduation plate being formed in a shape of a disk and having a plurality of graduation lines extending radially from a center toward a circumference thereof; and a detector detecting the graduation lines, the angle detection device detecting a rotation angle of the graduation plate based on an angle detected by the detector, the method includes: providing a plurality of the detectors disposed along the circumference of the graduation plate of the angle detection device; and calculating an error between the center of the graduation plate and a center of the detectors based on angles detected by the detectors.

With this arrangement, the method is capable of calculating an error between the center of the graduation plate and the center of the detectors, namely a center error, based on the angles detected by the detectors.

In the aspect of the invention, it is preferable that the plurality of the detectors include a first detector and a second detector being radially opposite to each other, an axis connecting the first and second detectors be defined as a coordinate axis in a cartesian coordinate system such that the center of the graduation plate exists on the coordinate axis before rotation of the graduation plate, and the error calculation method for an angle detection device include: a first angle calculation step for calculating an angle between the coordinate axis and a first straight line connecting the center of the graduation plate after the rotation of the graduation plate and the first detector based on the rotation angle of the graduation plate and an angle detected by the first detector; a second angle calculation step for calculating an angle between the coordinate axis and a second straight line connecting the center of the graduation plate after the rotation of the graduation plate and the second detector based on the rotation angle of the graduation plate and an angle detected by the second detector; a center calculation step for deriving equations for the first straight line and the second straight line based on the angles calculated in the first angle calculation step and the second angle calculation step and solving the equations for the first straight line and the second straight line to calculate a center position of the graduation plate after the rotation the graduation plate; and calculating the error between the center of the graduation plate and the center of the detectors.

The angle between the coordinate axis and the first straight line connecting the center of the graduation plate after the rotation of the graduation plate and the first detector corresponds to an angle error detected by the first detector. The angle between the coordinate axis and the second straight line connecting the center of the graduation plate after the rotation of the graduation plate and the second detector corresponds to an angle error detected by the second detector. Thus, in the first angle calculation step and the second angle calculation step, the angle between the coordinate axis and the first straight line and the angle between the coordinate axis and the second straight line are calculated based on the rotation angle of the graduation plate and the angles detected by the first and second detectors.

Further, since each of the first straight line and the second straight line passes through the center of the graduation plate after the rotation of the graduation plate, the intersection point of the first straight line and the second straight line is coincident with the center of the graduation plate.

Thus, in the center calculation step, the center position of the graduation plate after the rotation of the graduation plate is calculated by deriving equations for the first straight line and the second straight line based on the angles calculated in the first angle calculation step and the second angle calculation step and simultaneously solving the equations for the first straight line and the second straight line.

In other words, according to the aspect of the invention, the center error can be calculated based on the angles detected by the plurality of the detectors.

In the aspect of the invention, it is preferable that the plurality of the detectors include a first detector and a second detector being radially opposite to each other, an axis connecting the first and second detectors be defined as a coordinate axis in a cartesian coordinate system, and the error calculation method for an angle detection device include: a first angle change calculation step for calculating a change in an angle between the coordinate axis and a first straight line connecting the center of the graduation plate and the first detector after a 360-degree rotation of the graduation plate based on the rotation angle of the graduation plate and an angle detected by the first detector; a second angle change calculation step for calculating a change in an angle between the coordinate axis and a second straight line connecting the center of the graduation plate and the second detector after the 360-degree rotation of the graduation plate based on the rotation angle of the graduation plate and an angle detected by the second detector; a subtraction step for subtracting an average change after the 360-degree rotation of the graduation plate from the change in the angle calculated in the first angle change calculation step and subtracting the average change after the 360-degree rotation of the graduation plate from the change in the angle calculated in the second angle change calculation step; a center change calculation step for deriving equations for the first straight line and the second straight line based on the changes in the angles calculated in the subtraction step and solving the equations for the first straight line and the second straight line to calculate a change in a center position of the graduation plate; and calculating the error between the center of the graduation plate and the center of the detectors.

With this arrangement, in the first angle change calculation step and the second angle change calculation step, changes in angles between the coordinate axis and the first straight line and between the coordinate axis and the second straight line when the graduation plate is rotated by 360 degrees are calculated based on the rotation angle of the graduation plate and the angles detected by the first and second detectors.

Subsequently, in the subtraction step, an average change when the graduation plate is rotated by 360 degrees is subtracted from the change in the angle detected in the first angle change calculation step and the average change when the graduation plate is rotated by 360 degrees is subtracted from the change in the angle calculated in the second angle change calculation step. At this stage, the changes in the angles calculated in the first angle calculation step and the second angle calculation step are offset by the initial value of the rotation angle of the graduation plate. Thus, the offset can be removed by subtracting the average change when the graduation plate is rotated by 360 degrees.

Further, in the center change calculation step, a change in the center position of the graduation plate is calculated by deriving equations for the first straight line and the second straight line based on the changes in the angles calculated in the subtraction step and simultaneously solving the equations for the first straight line and the second straight line.

Thus, according to the invention, the center error can be calculated based on the angles detected by a plurality of the detectors even when the center of the graduation plate does not exist on the coordinate axis before the rotation of the graduation plate.

In the aspect of the invention, it is preferable that the plurality of the detectors include four or more even number of the detectors, the detectors be disposed to be radially opposite in pairs, an axis connecting the detectors of the respective pair be defined as a coordinate axis in a cartesian coordinate system, and the center position of the graduation plate or a change in the center position of the graduation plate be calculated and averaged based on the angles detected by the two detectors of the respective pair through the error calculation method for an angle detection device, thereby calculating the error between the center of the graduation plate and the center of the detectors With this arrangement, it is possible to calculate the center position of the graduation plate or a change in the center position of the graduation plate based on the angles detected by the two detectors of each pair by using the above-described error calculation method for the angle detection device. Since an error between the center of the graduation plate and the center of the detectors is calculated by averaging the values of the center position of the graduation plate or the values of a change in the center position of the graduation plate based on the pairs of detectors, the center error can be calculated with high accuracy, and therefore the angle error can be further reduced.

DETAILED DESCRIPTION OF PREFERRED EMBODIMENT(S)

[First Exemplary Embodiment]

A first exemplary embodiment of the invention will be described below with reference to the attached drawings.

Figure 1:
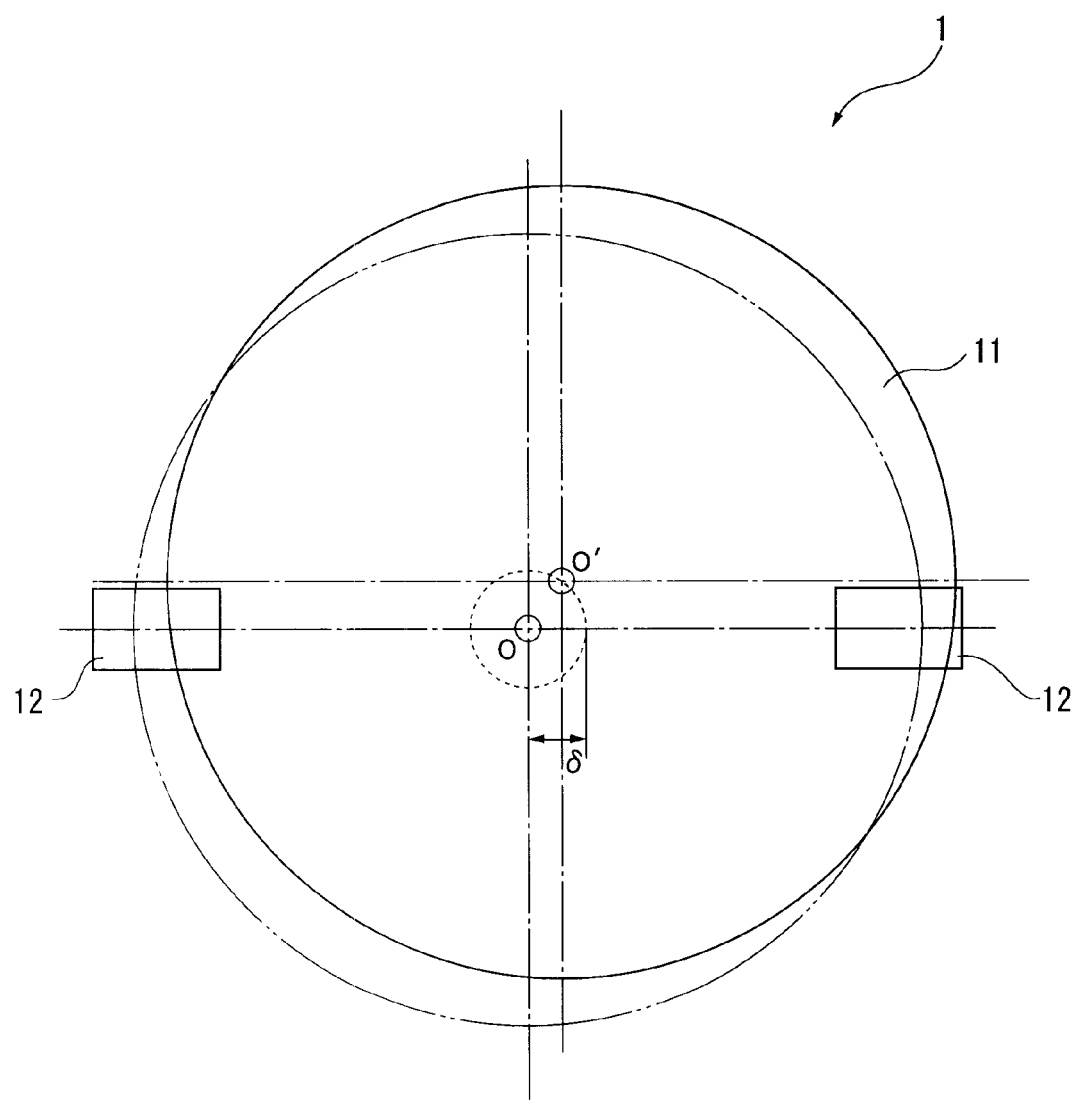
FIG. 1 shows an angle detection device according to a first exemplary embodiment of the invention.

FIG. 1 shows an angle detection device 1 according to the first exemplary embodiment of the invention.

As shown in FIG. 1, the angle detection device 1 is formed in the shape of a disk. The angle detection device 1 includes: a graduation plate 11 with a plurality of graduation lines extending radially from the center toward the circumference thereof; and two detectors for detecting the graduation lines, the two detectors 12 being disposed along the circumference of the graduation plate 11 in a radially-opposed manner, the two detectors 12 that detect the graduation lines. The angle detection device 1 is configured to detect the rotation angle of the graduation plate 11 based on the angles detected by the individual detectors 12.

In the angle detection device 1, a center error $\delta$ is generated between a center O of the detectors 12 and a center O' of the graduation plate 11 as a result of assembling, attachment to an object, a change in the temperature, or the like.

Figure 2:
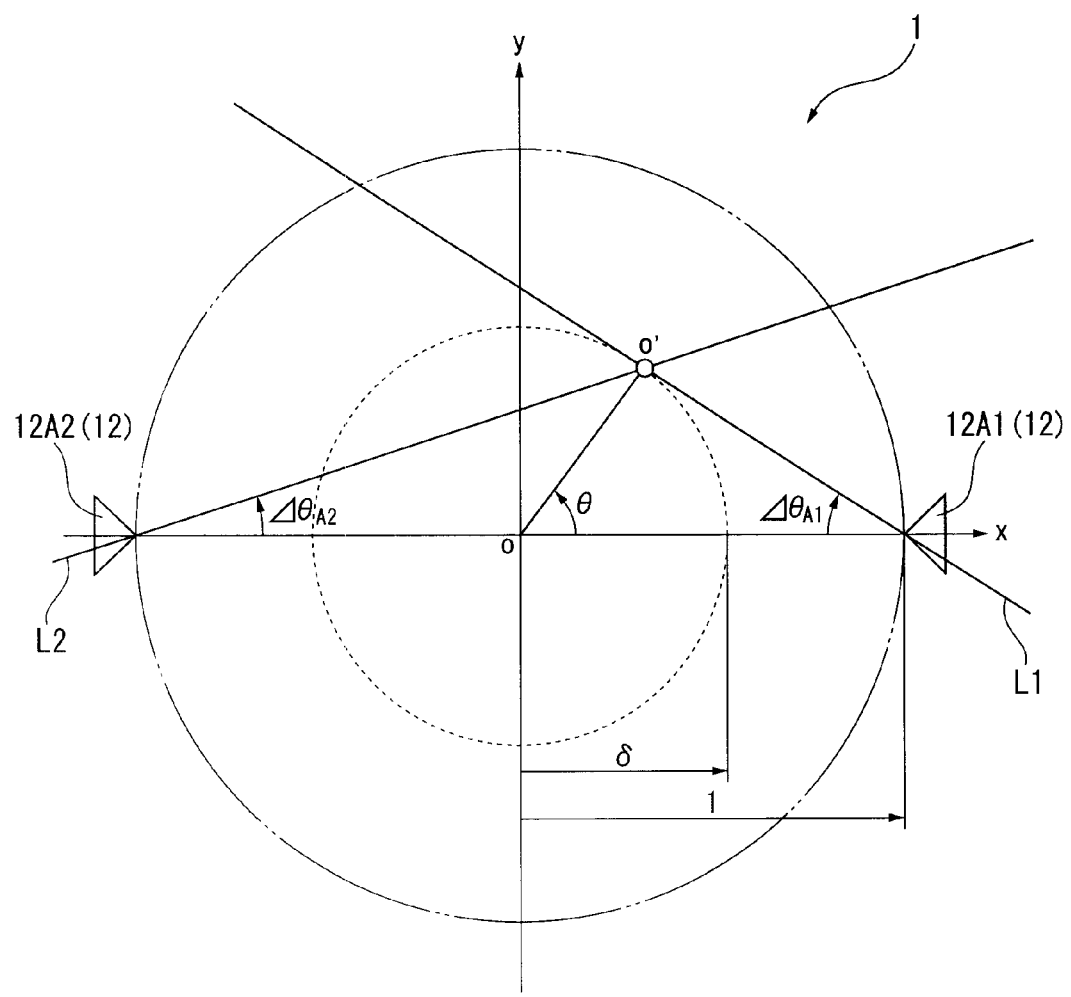
FIG. 2 shows an error calculation method for an angle detection device in the above exemplary embodiment.

When the graduation plate 11 rotates, the center O' of the graduation plate 11 moves on the circumference of a circle having a diameter equal to the center error $\delta$ (see a broken line in FIG. 2).

Description will be made below on a method for calculating the center error $\delta$ of the angle detection device 1 supposing that there is no error except the center error $\delta$. It should be noted that the distance between the individual detectors 12 and the center O of the detectors 12 is set at 1 for determining the center error $\delta$.

Figure 3:
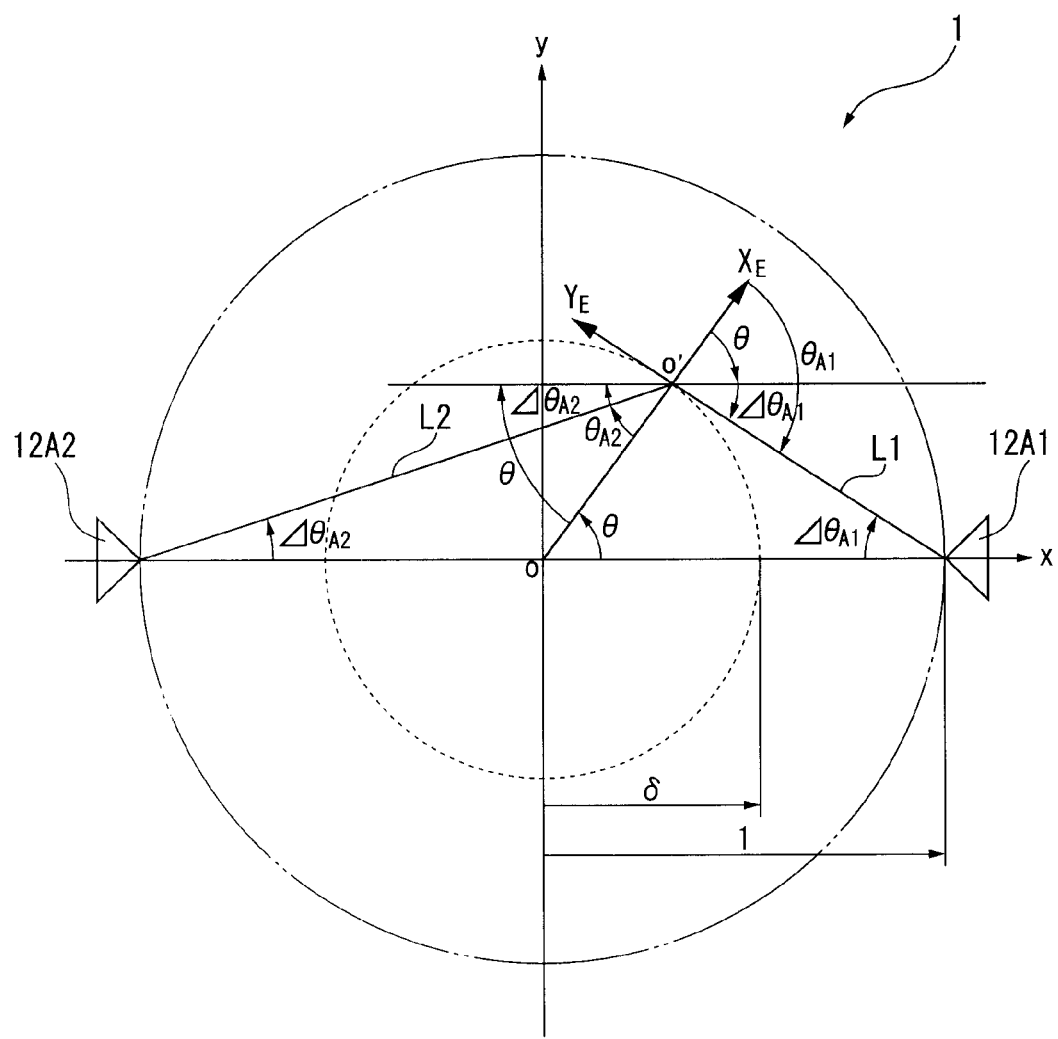
FIG. 3 shows a relationship between a rotation angle of a graduation plate and angles detected by detectors in the above exemplary embodiment.

FIG. 2 shows an error calculation method for the angle detection device 1. FIG. 3 shows a relationship between a rotation angle $\theta$ of the graduation plate 11 and detected angles $\theta_{A1}, \theta_{A2}$ of the individual detectors 12. Incidentally, the detector 12 on the right side is denoted by a reference numeral 12A1 and the detector 12 on the left side is denoted by a reference numeral 12A2 in FIGS. 2 and 3.

As shown in FIG. 2, a cartesian coordinate system with its origin at the center O of the detectors 12 is first defined. The axis connecting the detectors 12 is defined as the X-axis (a coordinate axis) and an axis orthogonal to the X-axis is defined as the Y-axis. It is assumed that the center O' of the graduation plate 11 exists on the X-axis before the rotation of the graduation plate 11 and the graduation plate 11 rotates by the rotation angle θ.

Incidentally, the rotation angle θ is calculated based on, for example, angles detected by the individual detectors 12 and another detector (not shown) disposed between the detectors 12 in accordance with the method disclosed in Japanese Patent No. 3826207.

As shown in FIG. 3, an angle error $\Delta\theta_{A1}$, that is, the degree of the angle between the X-axis and a first straight line L1 connecting the center O' of the rotated graduation plate 11 and the detector 12A1 is calculated based on the rotation angle θ of the graduation plate 11 and the detected angle $\theta_{A1}$ of the detector 12A1 (a first angle calculation step).

Subsequently, an angle error $\Delta\theta_{A2}$, that is, the angle between the X-axis and a second straight line L2 connecting the center O' of the rotated graduation plate 11 and the detector 12A2 is calculated based on the rotation angle θ of the graduation plate 11 and the detected angle $\theta_{A2}$ of the detector 12A2 (a second angle calculation step).

Specifically, in the first angle calculation step and the second angle calculation step, the angle errors $\Delta\theta_{A1}$, $\Delta\theta_{A2}$ are calculated by the following equations (4):

$$\Delta\theta_{A1} = \theta_{A1} - \theta$$

$$\Delta\theta_{A2} = \theta - \theta_{A2} \quad (4)$$

Further, based on the angle errors $\Delta\theta_{A1}$, $\Delta\theta_{A2}$ detected in the first angle calculation step and the second angle calculation step, respective equations for the first straight line L1 and the second straight line L2 are derived and simultaneously solved to calculate the center position of the rotated graduation plate 11 (a center calculation step).

Specifically, in the center calculation step, the following equation (5) for the first straight line L1 is derived based on the angle error $\Delta\theta_{A1}$ calculated in the first angle calculation step:

$$y = \tan\Delta\theta_{A1}(x-1) \quad (5)$$

In the center calculation step, the following equation (6) for the second straight line L2 is also derived based on the angle error $\Delta\theta_{A2}$ calculated in the second angle calculation step:

$$y = \tan\Delta\theta_{A2}(x=1) \quad (6)$$

In the center calculation step, the equations (5), (6) for the first straight line L1 and the second straight line L2 are simultaneously solved, thereby the center position of the rotated graduation plate 11 is calculated. Specifically, in the center calculation step, the center position ($O'_X$, $O'_Y$) of the rotated graduation plate 11 is calculated by the following equations (7):

$$o'_x = \frac{\tan\Delta\theta_{A1} + \tan\Delta\theta_{A2}}{\tan\Delta\theta_{A1} - \tan\Delta\theta_{A2}} \quad (7)$$

$$o'_y = \frac{2\tan\Delta\theta_{A1}\tan\Delta\theta_{A2}}{\tan\Delta\theta_{A1} - \tan\Delta\theta_{A2}}$$

In other words, according to the present exemplary embodiment, the center error δ between the center O' of the graduation plate 11 and the center O of the detectors 12 is calculated by executing the first angle calculation step, the second angle calculation step and the center calculation step.

The error calculation method for the angle detection device 1 according to the present exemplary embodiment provides the following advantage:
(1) The angle between the X-axis and the first straight line L1 corresponds to the angle error $\Delta\theta_{A1}$ of the detector 12A1 and the angle between the X-axis and the second straight line L2 corresponds to the angle error $\Delta\theta_{A2}$ of the detector 12A2 Each of the first straight line L1 and the second straight line L2 is a straight line passing through the center of the rotated graduation plate 11, and therefore the intersection point of the first straight line L1 and the second straight line L2 is coincident with the center O' of the graduation plate 11. By executing the first angle calculation step, the second angle calculation step and the center calculation step, the center error δ is calculated based on the detected angles $\theta_{A1}$, $\theta_{A2}$ of the individual detectors 12.

[Second Exemplary Embodiment]

A second exemplary embodiment of the invention will be described below with reference to the drawings.

Incidentally, the components that have already been explained will be denoted by the same reference numerals, and an explanation thereof will be omitted.

According to the above first exemplary embodiment, the center error δ is calculated by executing the first angle calculation step, the second angle calculation step and the center calculation step. On the other hand, the present exemplary embodiment is different from the first exemplary embodiment in that the center error δ is calculated by executing a first angle change calculation step, a second angle change calculation step, a subtraction step and a center change calculation step.

Figure 4:
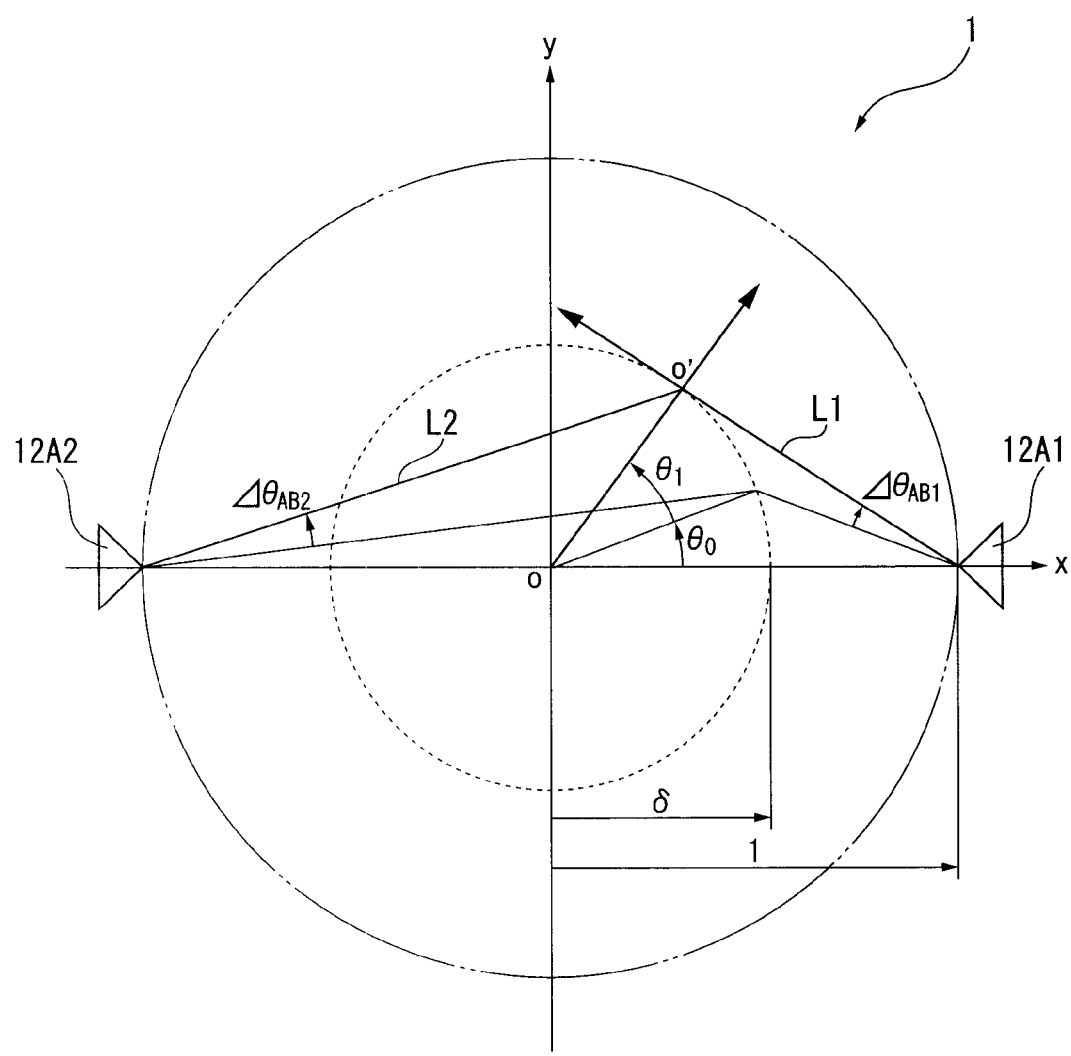
FIG. 4 shows a rotated graduation plate according to a second exemplary embodiment of the invention.

FIG. 4 shows the state of the rotated graduation plate 11 according to the second exemplary embodiment. In FIG. 4, the graduation plate 11 rotates relative to the X-axis by the rotation angle $\theta_1$ from a rotation angle $\theta_0$ (the initial value).

In the present exemplary embodiment, when the first angle calculation step and the second angle calculation step according to the above first exemplary embodiment are executed, the angle errors, $\Delta\theta_{AB1}$, $\Delta\theta_{AB2}$ are calculated as shown in FIG. 4.

Thus, it is not possible to derive the respective equations for the first straight line L1 and the second straight line L2.

Accordingly, an angle error change $\Delta\theta_{AC1}$, that is, a change in the angle between the X-axis and the first line L1 connecting the center O' of the graduation plate 11 and the detector 12A1 caused when the graduation plate 11 is rotated by 360 degrees is calculated based on the rotation angle θ of the graduation plate 11 and the detected angle $\theta_{A1}$ of the detector 12A1 (a first angle change calculation step).

An angle error change $\Delta\theta_{AC2}$, that is, a change in the angle between the X-axis and the second line L2 connecting the center O' of the graduation plate 11 and the detector 12A2 caused when the graduation plate 11 is rotated by 360 degrees is calculated based on the rotation angle θ of the graduation plate 11 and the detected angle $\theta_{A2}$ of the detector 12A2 (a second angle change calculation step).

Specifically, in the first angle change calculation step and the second angle change calculation step, the angle errors $\Delta\theta_{AC1}$, $\Delta\theta_{AC2}$ are respectively calculated by the following equations (8). Incidentally, θ in the equation (8) represents the rotation angle of the graduation plate 11 and $\Delta\theta_1$, $\Delta\theta_2$ represent the detected angles of the detectors 12.

$$\Delta\theta_{AC1} = \theta_{A1} - \theta$$

$$\Delta\theta_{AC2} = \theta - \theta_{A2} \quad (8)$$

An average change $(\overline{\Delta\theta(-)}_{AC1})$ when the graduation plate 11 is rotated by 360 degrees is subtracted from the angle error change $\Delta\theta_{AC1}$ calculated in the first angle change calculation step and an average change $(\overline{\Delta\theta(-)}_{AC2})$ of the angle error change $\Delta\theta_{AC2}$ when the graduation plate 11 is rotated by 360 degrees is subtracted from the angle error change $\Delta\theta_{AC2}$ calculated in the second angle change calculation step (the subtraction step). Incidentally, (-) represents a superscript bar of the symbol.

Specifically, in the subtraction step, angle error changes $\Delta\theta_{AD1}$, $\Delta\theta_{AD2}$ are respectively calculated by the following equations (9):

$$\Delta\theta_{AD1} = \Delta\theta_{AC1} - \overline{\Delta\theta}_{AC1}$$

$$\Delta\theta_{AD2} = \Delta\theta_{AC2} - \overline{\Delta\theta}_{AC2} \quad (9)$$

Further, based on the angle error changes $\Delta\theta_{AD1}$, $\Delta\theta_{AD2}$ calculated in the subtraction step, respective equations for the first straight line L1 and the second straight line L2 are derived and simultaneously solved to calculate a change in the center position of the graduation plate 11 (the center change calculation step).

Specifically, in the center change calculation step, the center position $(O'_X, O'_Y)$ of the graduation plate 11 is calculated by the following equations (10):

$$o'_x = \frac{\tan\Delta\theta_{AD1} + \tan\Delta\theta_{AD2}}{\tan\Delta\theta_{AD1} - \tan\Delta\theta_{AD2}} \quad (10)$$

$$o'_y = \frac{2\tan\Delta\theta_{AD1}\tan\Delta\theta_{AD2}}{\tan\Delta\theta_{AD1} - \tan\Delta\theta_{AD2}}$$

Figure 5A:
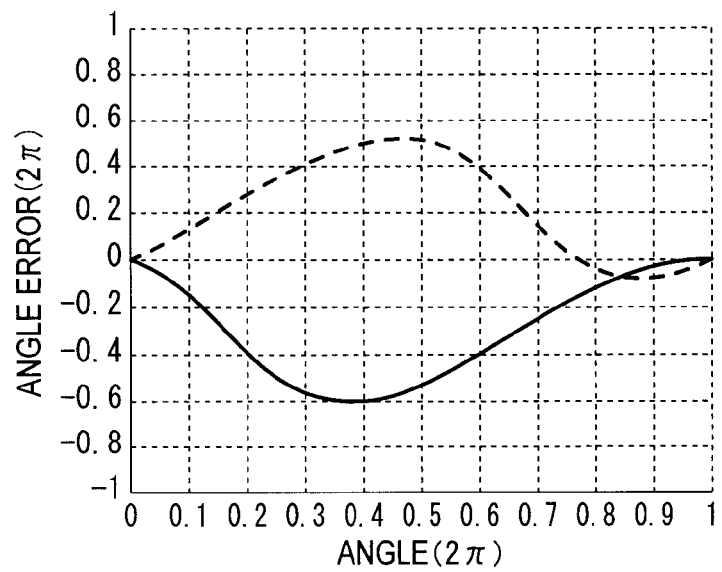
FIG. 5A is a graph showing changes in angle errors in the above exemplary embodiment.
Figure 5B:
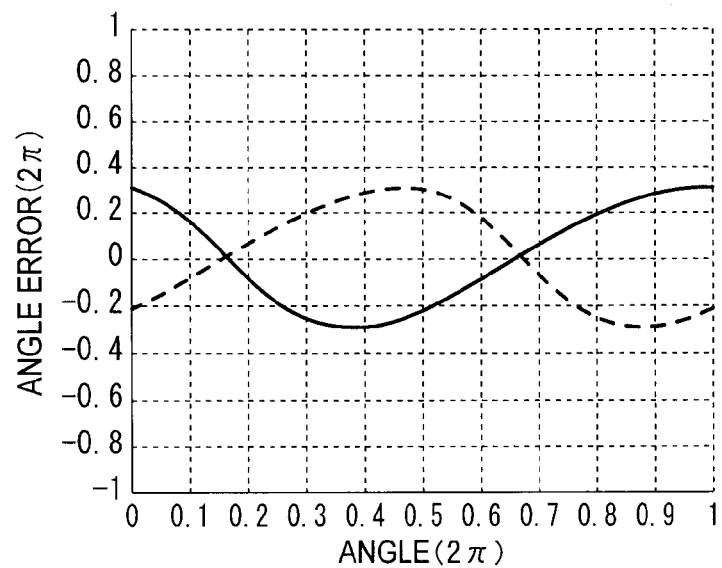
FIG. 5B is another graph showing changes in angle errors in the above exemplary embodiment.
Figure 5C:
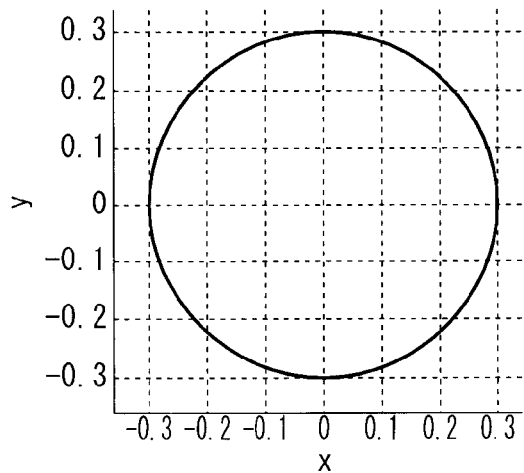
FIG. 5C is another graph showing a change in the center position of the graduation plate in the above exemplary embodiment.

FIGS. 5A, 5B and 5C show results of simulation of the angle error changes $\Delta\theta_{AC1}$, $\Delta\theta_{AC2}$, $\Delta\theta_{AD1}$, $\Delta\theta_{AD2}$ and a change in the center position of the graduation plate 11.

Incidentally, FIG. 5A shows the angle error changes $\Delta\theta_{AC1}$, $\Delta\theta_{AC2}$, in which the angle error is represented by the vertical axis and the rotation angle of the graduation plate 11 is represented by the horizontal axis. FIG. 5B shows the angle error changes $\Delta\theta_{AD1}$, $\Delta\theta_{AD2}$, in which the angle error is represented by the vertical axis and the rotation angle of the graduation plate 11 is represented by the horizontal axis. FIG. 5C shows a change in the center position of the graduation plate 11 in accordance with the cartesian coordinate system with its origin at the center O of the detectors 12.

In the simulation, the graduation plate 11 is rotated by 360 degrees with the center angle δ is equal to 0.3 and the initial value $\theta_0$ is equal to $\pi/4$.

First of all, the first angle change calculation step and the second angle change calculation step are executed, thereby, as shown in FIG. 5A, the angle error change $\Delta\theta_{AC1}$ (a solid line in FIG. 5A) and $\Delta\theta_{AC2}$ (a broken line in FIG. 5A) are obtained.

Next, the subtraction step is executed, thereby, as shown in FIG. 5B, the angle error change $\Delta\theta_{AD1}$ (a solid line in FIG. 5B) and $\Delta\theta_{AD2}$ (a broken line in FIG. 5B) are obtained.

Further, the center change calculation step is executed, thereby, as shown in FIG. 5C, a change in the center position of the graduation plate 11 is obtained.

Since a change in the center position of the graduation plate 11 is shown as a circle having a radius of 0.3 as shown in FIG. 5C, it can be confirmed that the center error δ is calculated.

In other words, according to the present exemplary embodiment, the center error δ between the center O' of the graduation plate 11 and the center O of the detectors 12 is calculated by executing the first angle change calculation step, the second angle change calculation step, the subtraction step and the center change calculation step.

The error calculation method for the angle detection device 1 according to the present exemplary embodiment provides the following advantage:

(2) The first angle change calculation step, the second angle change calculation step, the subtraction step and the center change calculation step are executed, thereby the center error δ is calculated based on the detected angles $\theta_{A1}$, $\theta_{A2}$ of the individual detectors 12 even when the center of the graduation plate 11 does not exist on the X-axis before the rotation of the graduation plate 11.

[Third Exemplary Embodiment]

A third exemplary embodiment of the invention will be described below with reference to the drawings.

Figure 6:
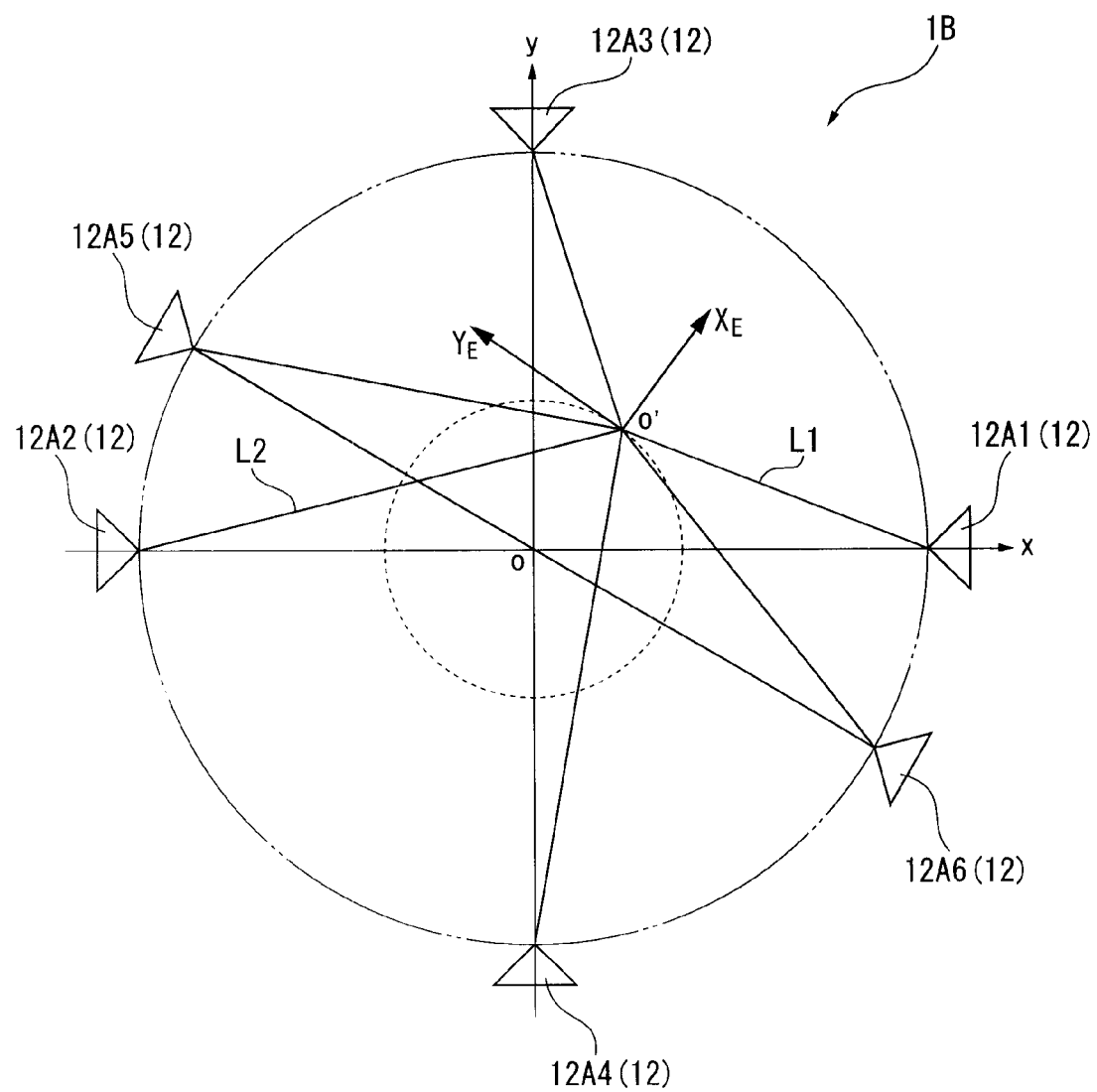
FIG. 6 shows an angle detection device according to a third exemplary embodiment of the invention.

FIG. 6 shows an angle detection device 1B according to the third exemplary embodiment of the invention. Incidentally, in FIG. 6, the detector 12 on the right side is denoted by a reference numeral 12A1, the detector 12 on the left side is denoted by a reference numeral 12A2, the detector 12 on the upper side is denoted by a reference numeral 12A3, the detector 12 on the lower side is denoted by a reference numeral 12A4, the detector 12 between the detectors 12A2, 12A3 is denoted by a reference numeral 12A5, and the detector 12 between the detectors 12A1, 12A4 is denoted by a reference numeral 12A6.

In the above exemplary embodiments, the angle detection device 1 includes the two detectors 12. On the other hand, the present exemplary embodiment is different in that the angle detection device 1B includes four or more even number of the detectors 12.

As shown in FIG. 6, the angle detection device 1B includes the graduation plate 11 (not shown) and the six detectors 12 for detecting the graduation lines, the detectors 12 being disposed along the circumference of the graduation plate 11 such that the detectors 12 are radially opposite to each other in pairs. The angle detection device 1B detects the rotation angle of the graduation plate 11 based on angles detected by the detectors 12.

The pairs of detectors 12 include three pairs, i.e. a pair of the detectors 12A1, 12A2, a pair of the detectors 12A3, 12A4 and a pair of the detectors 12A5, 12A6.

Description will be made below on a method for calculating the center error δ of the angle detection device 1B.

A cartesian coordinate system with its origin at the center O of the detectors 12 is initially defined. Then, an axis connecting one of the pairs of detectors 12 (the detectors 12A1, 12A2) is defined as the X-axis (a coordinate axis) and an axis perpendicular to the X-axis is defined as the Y-axis.

The center positions of the graduation plate 11 or changes in the center position of the graduation plate 11 are calculated and averaged based on angles detected by each two of the detectors 12 (each pair of the detectors 12) by using the error calculation method for the angle detection device 1 according to the above first exemplary embodiment or the above second exemplary embodiment.

Specifically, when the values of the center position of the graduation plate 11 or a change in the center position of the graduation plate 11 calculated based on angles detected by the pair of detectors 12A1, 12A2, the pair of detectors 12A3, 12A4 and the pair of detectors 12A5, 12A6 are respectively $O_1'$, $O_2'$ and $O_3'$, these values $O_1'$, $O_2'$ and $O_3'$ are averaged by the following equation (11):

$$o' = \frac{(o_1' + o_2' + o_3')}{3} \tag{11}$$

Incidentally, when the number of the pairs of detectors 12 is increased to n, the above equation (11) can be written as the following equation (12):

$$o' = \frac{1}{N}\sum_{i=1}^{N}(o_i') \tag{12}$$

Figure 7A:
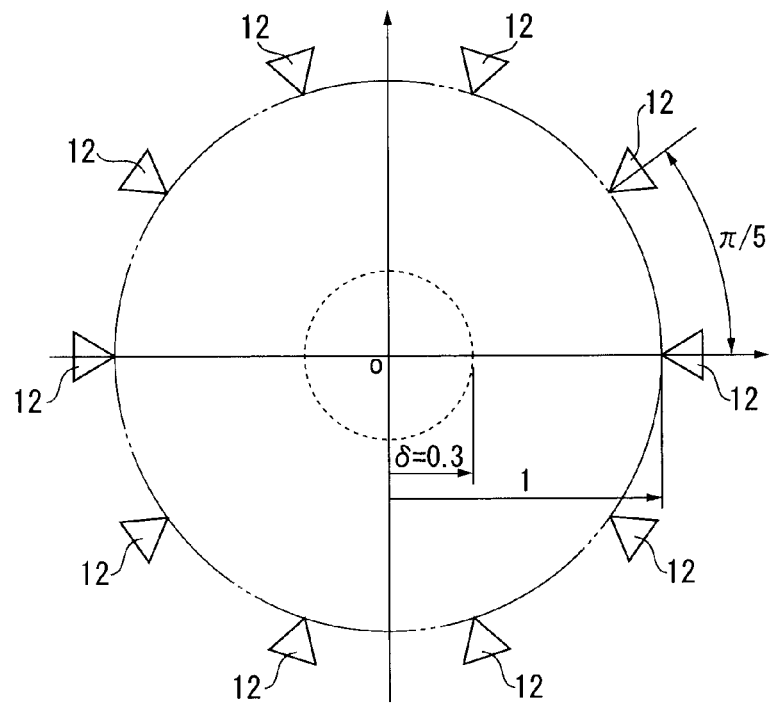
FIG. 7A shows results of simulation by using five pairs of detectors in the above exemplary embodiment.
Figure 7B:
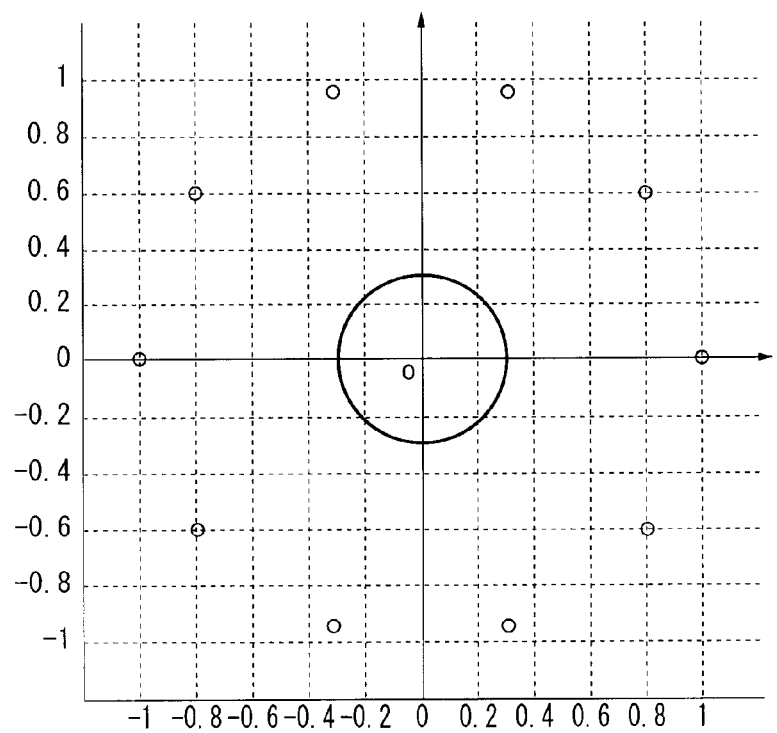
FIG. 7B shows the results of simulation by using the five pairs of detectors in the above exemplary embodiment.
Figure 8A:
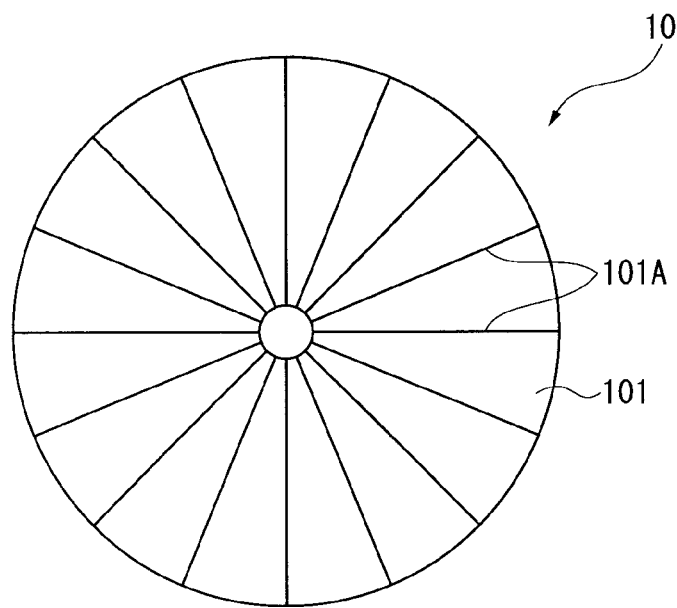
FIG. 8A schematically shows a graduation plate.
Figure 8B:
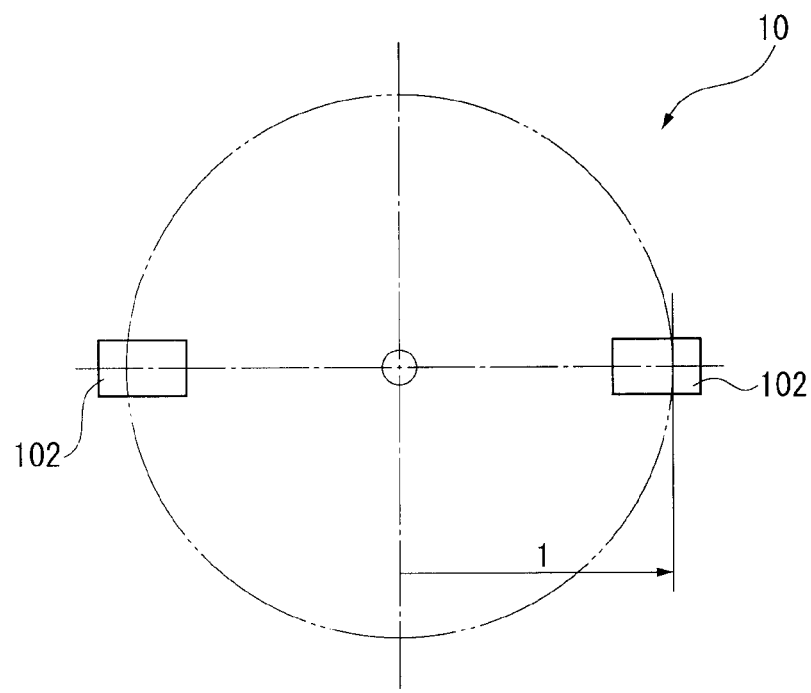
FIG. 8B schematically shows detectors.
Figure 9:
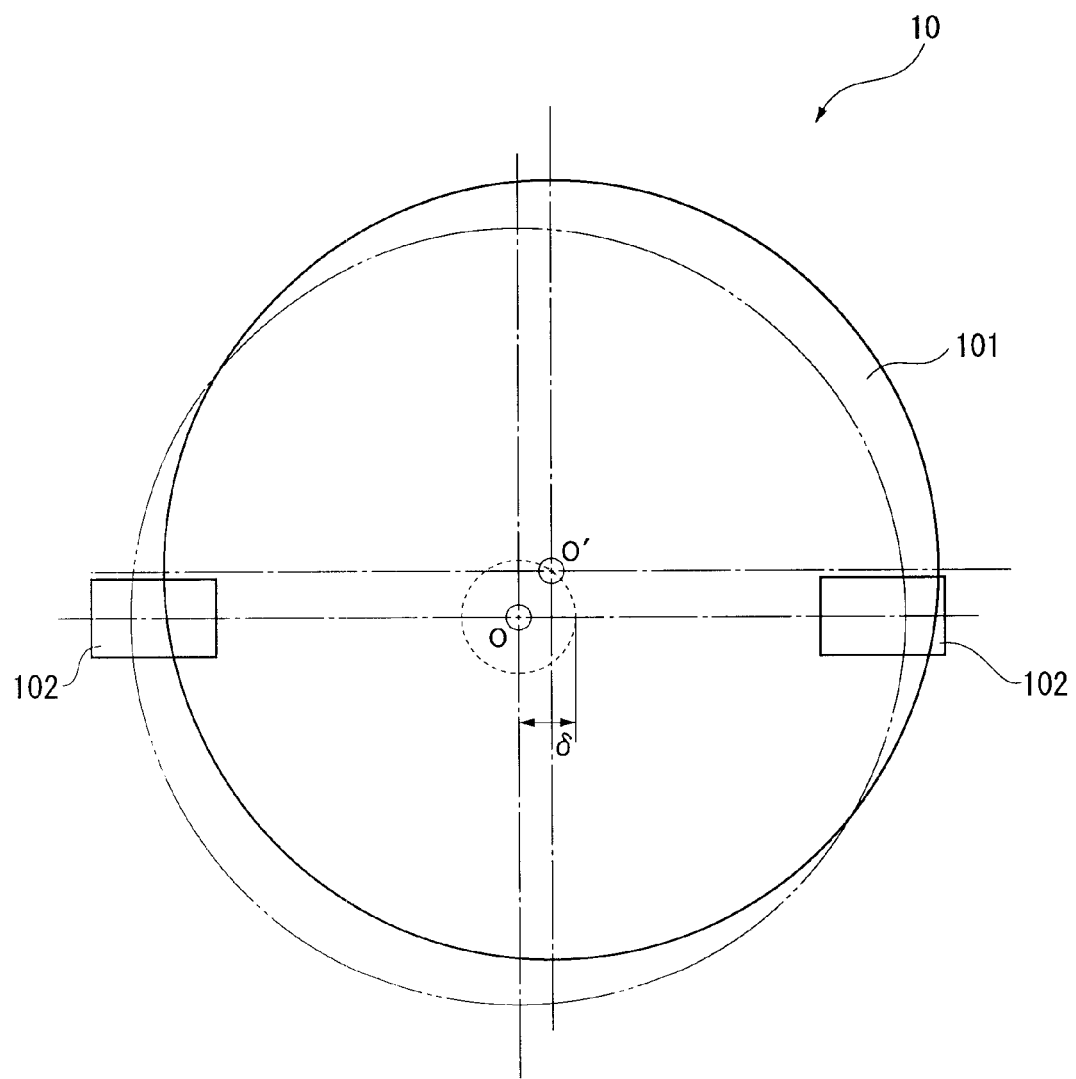
FIG. 9 schematically shows an angle detection device.
Figure 10A:
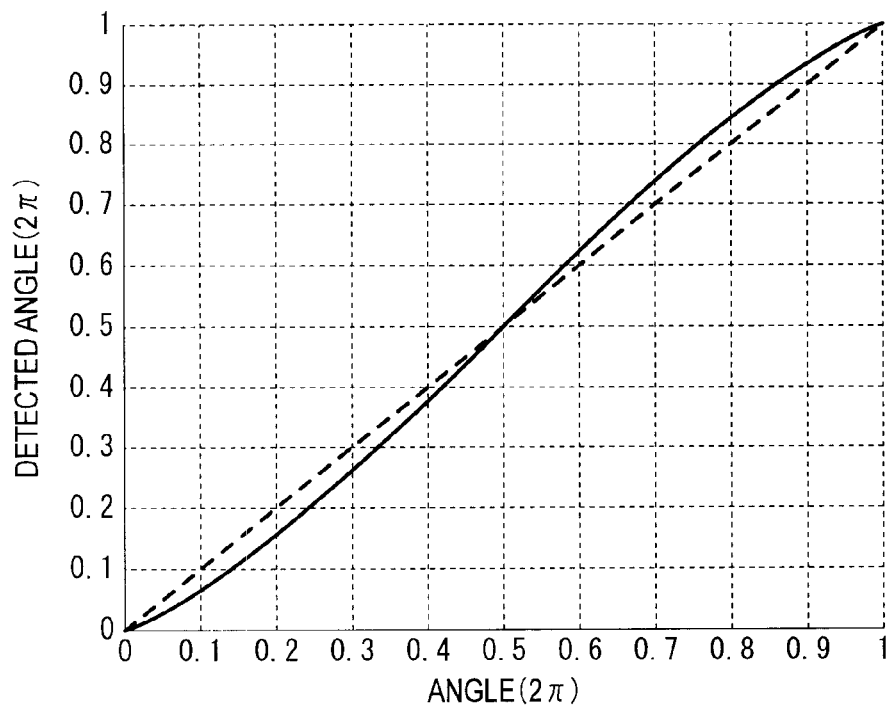
FIG. 10A is a graph showing results of simulation of the relationship between the detected angle of the angle detection device and the rotation angle of the graduation plate.
Figure 10B:
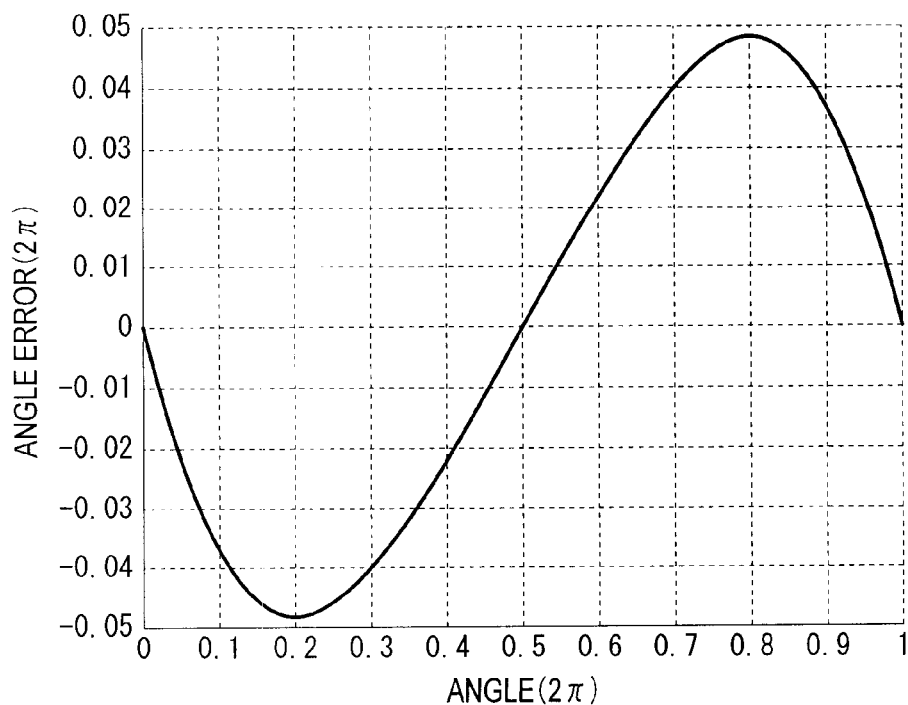
FIG. 10B is a graph showing the results of simulation of the relationship between the detected angle of the angle detection device and the rotation angle of the graduation plate.
Figure 11:
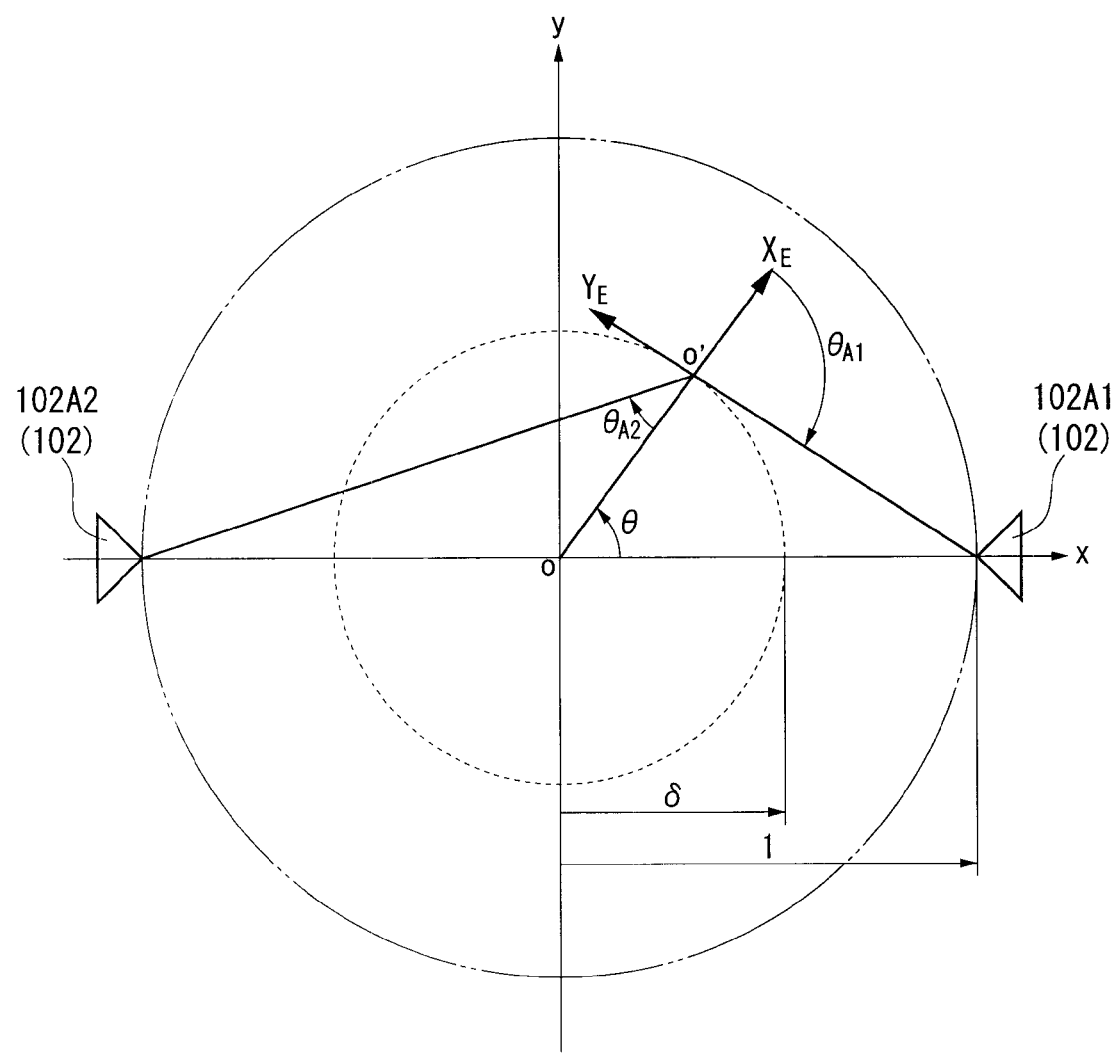
FIG. 11 shows a relationship between the rotation angle of the graduation plate and angles detected by the detectors.
Figure 12A:
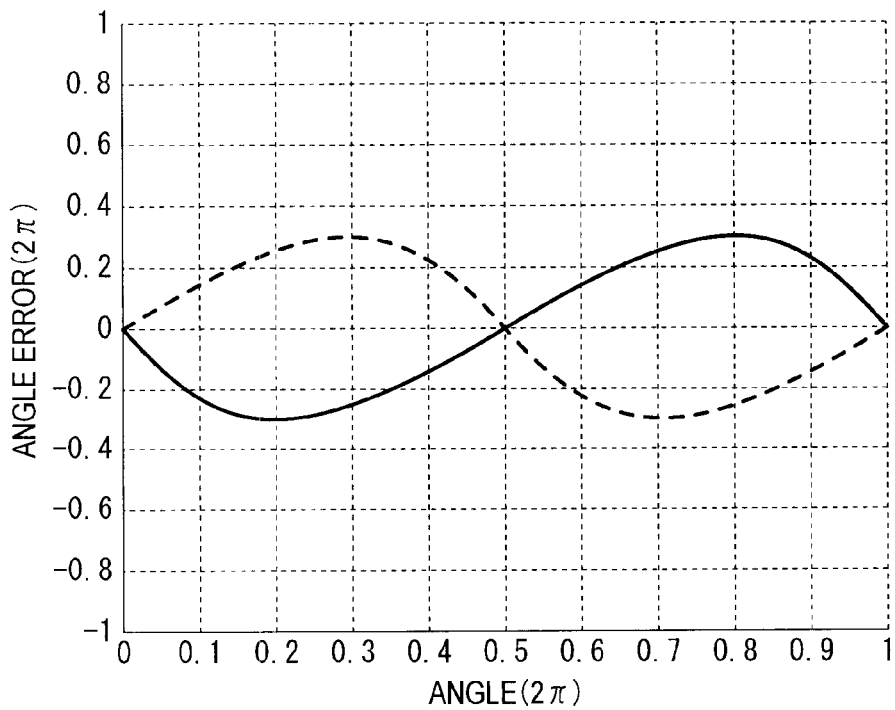
FIG. 12A is a graph showing results of simulation of an angle error when a center error is relatively large.
Figure 12B:
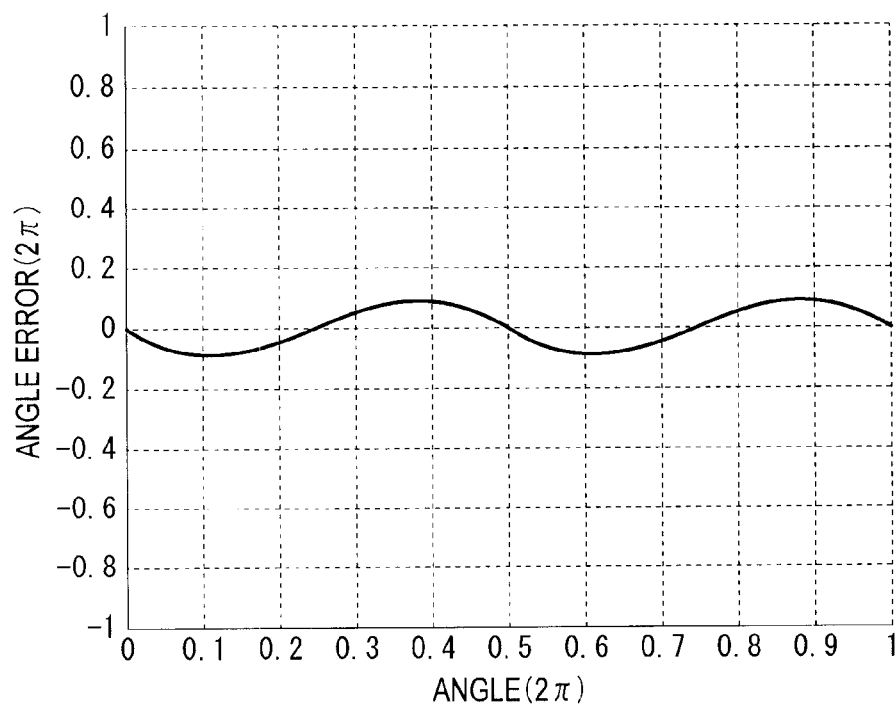
FIG. 12B is another graph showing the results of simulation of the angle error when the center error is relatively large.
Figure 13A:
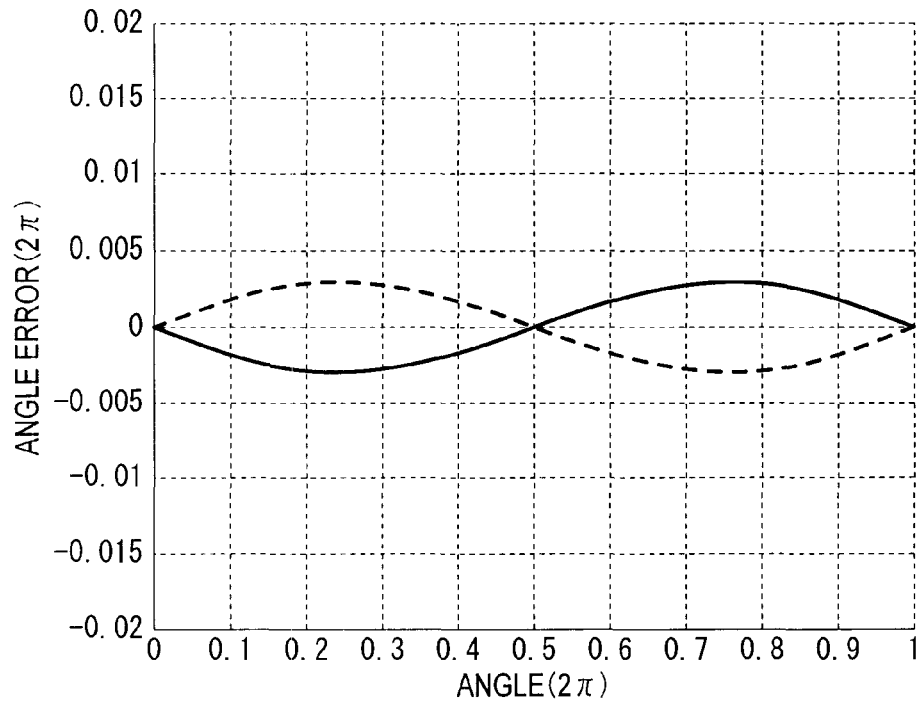
FIG. 13A is a graph showing results of simulation of an angle error when the center error is relatively small.
Figure 13B:
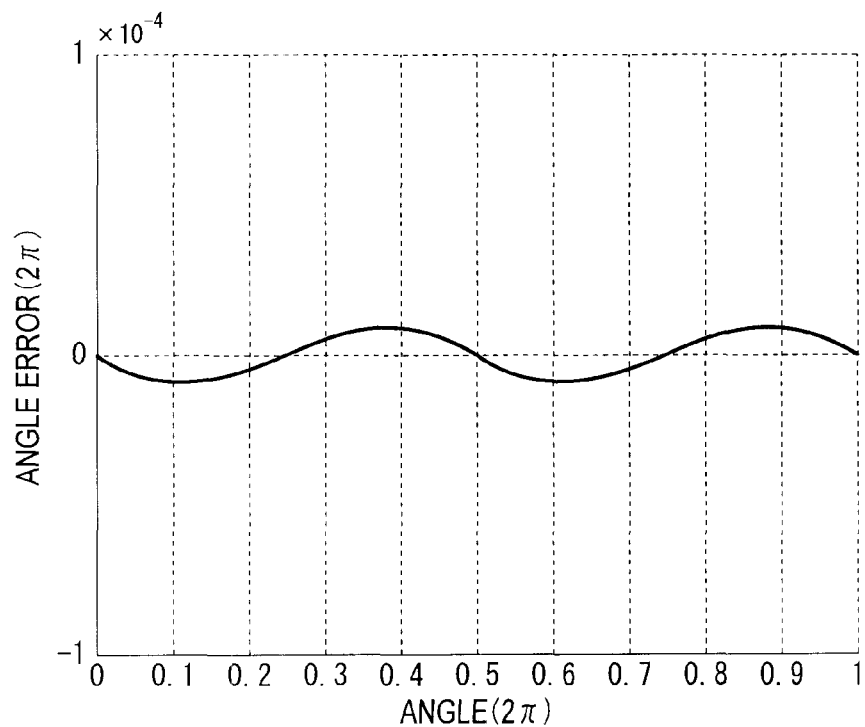
FIG. 13B is another graph showing the results of simulation of the angle error when the center error is relatively small.

FIGS. 7A and 7B shows the results of simulation obtained when there are five pairs of detectors 12. Incidentally, FIG. 7A shows the arrangement of the detectors 12 and FIG. 7B shows a change in the center position of the graduation plate 11 in the cartesian coordinate system with its origin at the center O of the detectors 12.

As shown in FIG. 7A, in the simulation, the graduation plate 11 is rotated by 360 degrees when intervals between adjacent ones of the detectors 12 are set at constant intervals ($\pi/5$) and the center error $\delta$ is equal to 0.3.

Since a change in the center position of the graduation plate 11 is shown as a circle having a radius of 0.3 as shown in FIG. 7B, it can be confirmed that the center error $\delta$ is calculated.

The error calculation method for the angle detection device 1B according to the present exemplary embodiment provides not only the same advantages as in the above exemplary embodiments but also the following advantage:

(3) Since the center error $\delta$ is calculated by averaging the values of the center position of the graduation plate 11 or the values of a change in the center position of the graduation plate 11 on the basis of the pairs of the detectors 12, the center error $\delta$ can be calculated with high accuracy, and therefore the angle error can be further reduced.

[Modifications of Exemplary Embodiment(s)]

Incidentally, the invention is not limited to the above exemplary embodiments, but includes modifications and improvements as long as an object of the present invention can be achieved.

In the above exemplary embodiments, the angle detection devices 1, 1B each include two or more even number of detectors disposed along the circumference of the graduation plate 11 such that the detectors are opposite in a radial direction. However, it is only required for an angle detection device to include a plurality of detectors disposed along a graduation plate.

What is claimed is:

1. An error calculation method for an angle detection device, the angle detection device comprising: a graduation plate being formed in a shape of a disk and having a plurality of graduation lines extending radially from a center toward a circumference thereof; and a plurality of detectors that detect the graduation lines, the angle detection device detecting a rotation angle of the graduation plate based on angles detected by the plurality of the detectors, the method comprising:
providing the plurality of the detectors disposed along the circumference of the graduation plate of the angle detection device; and
when the graduation plate is rotated by a predetermined rotation angle, calculating the center of the graduation plate based on the angles detected by the plurality of the detectors and the predetermined rotation angle of the graduation plate and calculating an error between the center of the graduation plate and a center of the detectors based on angles detected by the detectors.

2. The method according to claim 1, wherein
the plurality of the detectors include a first detector and a second detector being radially opposite to each other,
an axis connecting the first and second detectors is defined as a coordinate axis in a cartesian coordinate system such that the center of the graduation plate exists on the coordinate axis before rotation of the graduation plate, and
the method comprises:
a first angle calculation for calculating an angle between the coordinate axis and a first straight line connecting the center of the graduation plate after the rotation of the graduation plate and the first detector based on the rotation angle of the graduation plate and an angle detected by the first detector;
a second angle calculation for calculating an angle between the coordinate axis and a second straight line connecting the center of the graduation plate after the rotation of the graduation plate and the second detector based on the rotation angle of the graduation plate and an angle detected by the second detector;
a center calculation for deriving equations for the first straight line and the second straight line based on the angles calculated in the first angle calculation and the second angle calculation and solving the equations for the first straight line and the second straight line to calculate a center position of the graduation plate after the rotation the graduation plate; and
calculating the error between the center of the graduation plate and the center of the detectors.

3. The method according to claim 1, wherein
the plurality of the detectors include a first detector and a second detector being radially opposite to each other,
an axis connecting the detectors is defined as a coordinate axis in a cartesian coordinate system, and
the method comprises:
a first angle change calculation for calculating a change in an angle between the coordinate axis and a first straight line connecting the center of the graduation plate and the first detector after a 360-degree rotation of the graduation plate based on the rotation angle of the graduation plate and an angle detected by the first detector;
a second angle change calculation for calculating a change in an angle between the coordinate axis and a second straight line connecting the center of the graduation plate and the second detector after the 360-degree rotation of the graduation plate based on the rotation angle of the graduation plate and an angle detected by the second detector;
a subtraction for subtracting an average change after the 360-degree rotation of the graduation plate from the change in the angle calculated in the first angle change calculation and subtracting the average change after the 360-degree rotation of the graduation plate from the change in the angle calculated in the second angle change calculation;
a center change calculation for deriving equations for the first straight line and the second straight line based on the changes in the angles calculated in the subtraction and solving the equations for the first straight line and the second straight line to calculate a change in a center position of the graduation plate; and calculating the error between the center of the graduation plate and the center of the detectors.

4. The method according to claim 1, wherein
the plurality of the detectors include four or more even number of the detectors,
the detectors are disposed to be radially opposite in pairs each having a first detector and a second detector,
an axis connecting the first and second detectors is defined as a coordinate axis in a cartesian coordinate system, and
the method comprises:
a first angle calculation for calculating an angle between the coordinate axis and a first straight line connecting the center of the graduation plate after rotation of the graduation plate and the first detector based on the rotation angle of the graduation plate and an angle detected by the first detector;
a second angle calculation for calculating an angle between the coordinate axis and a second straight line connecting the center of the graduation plate after the rotation of the graduation plate and the second detector based on the rotation angle of the graduation plate and an angle detected by the second detector;
a center calculation for deriving equations for the first straight line and the second straight line based on the angles calculated in the first angle calculation and the second angle calculation and solving the equations for the first straight line and the second straight line to calculate a center position of the graduation plate after the rotation the graduation plate for each of the pairs of detectors; and
calculating the error between the center of the graduation plate and the center of the detectors by averaging the center positions calculated for the respective pairs of detectors through the center calculation, the first angle calculation, and the second angle calculation.

5. The method according to claim 1, wherein
the plurality of the detectors include four or more even number of the detectors,
the detectors are disposed to be radially opposite in pairs each having a first detector and a second detector,
an axis connecting the first and second detectors is defined as a coordinate axis in a cartesian coordinate system, and
the method comprises:
a first angle change calculation for calculating a change in an angle between the coordinate axis and a first straight line connecting the center of the graduation plate and the first detector after a 360-degree rotation of the graduation plate based on the rotation angle of the graduation plate and an angle detected by the first detector;
a second angle change calculation for calculating a change in an angle between the coordinate axis and a second straight line connecting the center of the graduate plate and the second detector after the 360-degree rotation of the graduation plate based on the rotation angle of the graduate plate and an angle detected by the second detector;
a subtraction for subtracting an average change after the 360-degree rotation of the graduation plate from the change in the angle calculated in the first angle change calculation and subtracting the average change after the 360-degree rotation of the graduation plate from the change in the angle calculated in the second angle change calculation;
a center change calculation for deriving equations for the first straight line and the second straight line based on the changes in the angles calculated in the subtraction and solving the equations for the first straight line and the second straight line to calculate a change in a center position of the graduation plate for each of the pairs of detectors; and
calculating the error between the center of the graduation plate and the center of the detectors by averaging the center positions calculated for the respective pairs of detectors through the center change calculation and the subtraction.

* * * * *